Jan. 5, 1954

J. U. WHITE 2,664,779

FLAME ANALYZER AND FLAME SOURCE THEREFOR

Filed June 13, 1950

INVENTOR
JOHN U. WHITE
BY
Campbell, Brumbaugh, Free and Graves
ATTORNEY

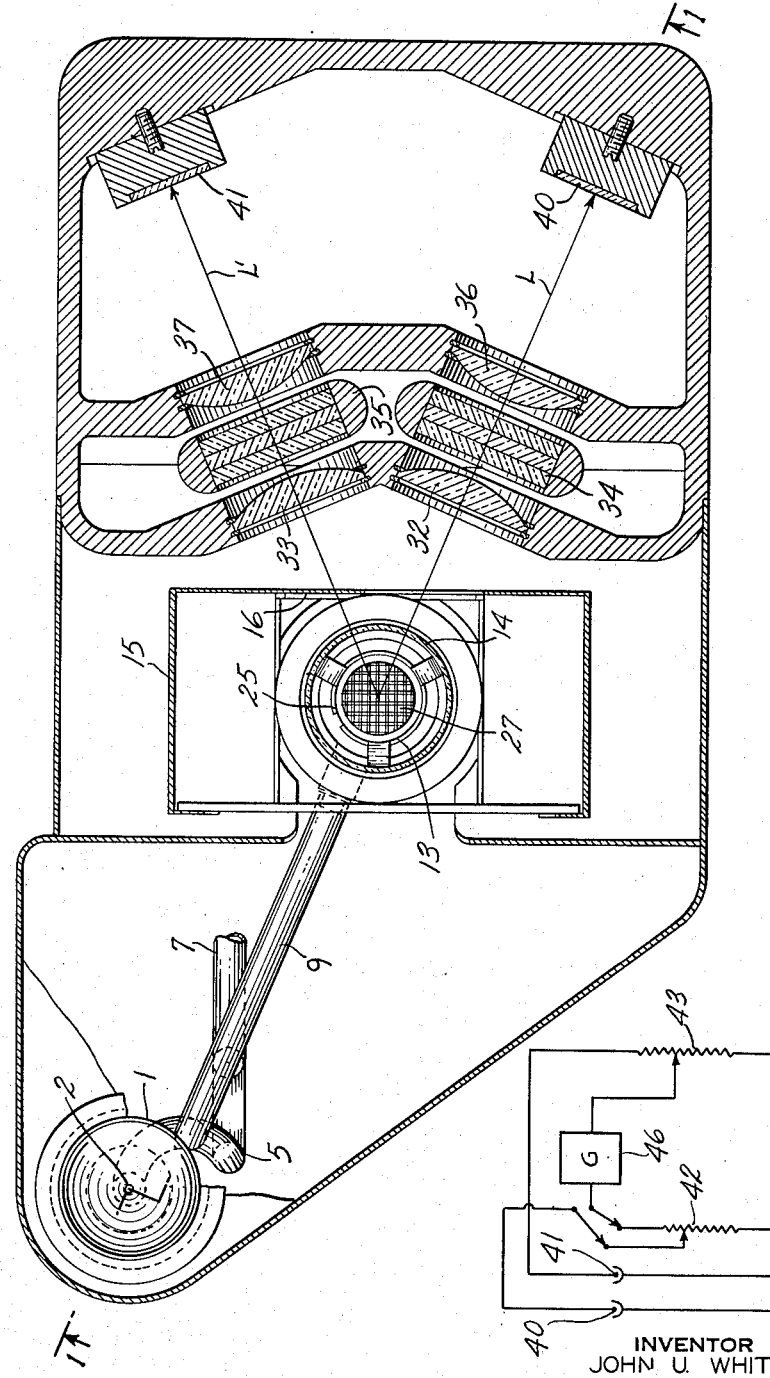

Patented Jan. 5, 1954

2,664,779

UNITED STATES PATENT OFFICE 2,664,779

FLAME ANALYZER AND FLAME SOURCE THEREFOR

John U. White, Darien, Conn.

Application June 13, 1950, Serial No. 167,791

7 Claims. (Cl. 88—14)

This invention relates to apparatus for qualitative and quantitative emission analysis, and more particularly to a flame analyzer which provides a pure flame for exciting the substance being analyzed.

Atoms and molecules when excited by heat or other energy emit light of characteristic wave length whose intensity is a function of the amount of substance present. For example, different elements, when present in a flame, impart different colors to the flame. The sodium flame is yellow and the potassium flame is purple. This phenomenon is utilized in one of the elementary forms of qualitative analysis. One convenient means of activation is the flame of an ordinary burner, using a gaseous fuel such as natural or artificial gas, acetylene, etc., and this type of energy source has found commercial application in the flame photometer and flame spectrograph. As is well known, these are useful to determine quantitatively the presence of many elements, particularly metals. The substance to be analyzed is fed into the flame, preferably in liquid form or in solution under controlled conditions, and the emitted light characteristic of the elements in question is accurately measured. This is usually done by a photosensitive cell which activates a galvanometer or other meter or recorder. The cell may be sensitive to light of the particular wave length or a suitable monochromator or filter may be used. Speed of analysis is an outstanding feature of this method.

The detection systems in use are necessarily quite sensitive, so that even traces of impurities in the atmosphere on which the flame feeds may lead to errors of large magnitude. In a flame photometer, for example, dust or smoke particles reaching the flame may cause jumps in the galvanometer so large and so frequent that it is impossible to take accurate readings. In a spectrograph dust or smoke particles may give rise to spurious lines and incorrect intensities in the spectrogram.

It is an object of the present invention to provide a flame analyzer for qualitative and quantitative emission analysis, incorporating a flame source with means for preventing impurities from entering the flame.

This and other objects are achieved in accordance with the invention by blanketing the flame employed as an energy source in an atmosphere of purified noncombustible gas. The term "purified noncombustible gas" as used herein refers to combustion-supporting and inert gases such as oxygen, nitrogen, carbon dioxide, air, and the like, or mixtures thereof which contain substantially no impurities which would affect the results of analysis of a substance. When a flame is "blanketed," as the term is used herein, the flame is completely enveloped in the gas. Thus all extraneous impurities are prevented from approaching the flame so that more accurate results are obtainable.

A special advantage of the invention is the blanketing of the flame in an atmosphere of purified combustion-supporting gas and sample to be analyzed, so that in this special case all such gas on which the flame feeds contains substantially only purified combustion-supporting gas and sample. This permits an increase in the emitted light intensity when only small amounts of substance are to be detected or analyzed. The term "purified combustion-supporting gas" as used herein refers to pure oxygen or oxygen-containing gas mixtures such as air, oxygen and carbon dioxide, oxygen and nitrogen, etc., which contain substantially no impurities which would affect the results of analysis of a substance.

Another special advantage of the invention is the blanketing of the flame in an atmosphere of purified inert gas which is neither combustion-supporting nor combustible, such as nitrogen or carbon dioxide. In this way the appearance of the flame is altered, becoming nonluminous except for the small cones directly above the grid of the burner, where the combustion takes place. The amount of light emitted by the flame in the absence of sample is thus greatly reduced, and the instrument's sensitivity is correspondingly increased in the detection of elements whose characteristic emission lines are interfered with by the light normally emitted from the flame.

The blanketing gas is purified by known methods. For example, gases such as plant or factory air containing acid droplets, chemicals, etc. may be passed through fluidized solid beds of silica gel, aluminum oxide, and the like to remove suspended particles. Also, the gas may be purified by electrostatic precipitators and centrifugal separators for removal of suspended particles from gases, mechanical gas filters and ultra filters, and scrubbers which wash suspended particles from gases.

The apparatus of the invention comprises a flame source and means for blanketing the flame thereof with purified noncombustible gas. In one embodiment this means comprises a chimney surrounding the flame, or, if desired, the flame and entire burner, and means for introducing purified blanketing gas into the space between the flame or the burner and the chimney. The substance to be analyzed is introduced into the flame in any of several ways, as, for example, by feeding it directly into the flame, or by feeding it into the blanketing gas or the gaseous fuel at or adjacent the respective intakes therefor of the burner, or any combination of these.

A preferred embodiment is to introduce the substance to be analyzed into combustion-supporting gas and feed the gas-sample mixture into the intake of the burner and also into the space between the flame and the chimney. In this way the flame is blanketed with sample to be analyzed as well as with combustion-supporting gas.

In another embodiment inert gas is introduced into the space between the flame and the chimney and combustion-supporting gas fed into the intake of the burner. The substance to be analyzed is introduced into the flame in any of the several ways, as, for example, by feeding it directly into the flame, or into the inert atmosphere, or into the combustion-supporting gas or the gaseous fuel, or any combination of these. A preferred method is to introduce the substance to be analyzed into the combustion-supporting gas fed into the intake of the burner.

The burner per se forms no part of the present invention and may be of conventional design. Suitable are gas burners, such as Bunsen, Meker and Fischer burners, which function at normal atmospheric pressure and have an air intake open to the atmosphere. When these burners are incorporated in the apparatus of the invention, it is desirable to completely surround them with the chimney and to introduce purified combustion-supporting gas, preferably containing substances to be analyzed, into the space between the burner and the chimney, so that the mixture of sample and combustion-supporting gas is drawn into the intake of the burner and also flows upwardly along side of the burner, enveloping the flame on all sides. However, it is also possible to employ a chimney which surrounds only the flame, and in this event purified combustion-supporting gas may be introduced at the intake, containing sample to be studied if desired, and either combustion-supporting or inert gas or a mixture thereof separately introduced into the chimney, and containing sample, if desired.

It is also convenient to employ blast burners which operate on combustion-supporting gas which is introduced thereinto under pressure. Such burners may be used with natural or artificial gas, acetylene or other fuels. With such a burner the chimney need surround only that portion of the burner adjacent the flame, but the preferable form of construction includes a chimney surrounding both the burner and the flame.

This apparatus is useful as the flame source for flame photometers, flame spectrographs and other types of flame analyzers. Because of the purity of the flame produced it is particularly advantageous for the quantitative analysis of mixtures.

The drawings show one embodiment of flame source in accordance with the invention, as used in conjunction with an internal standard flame photometer of conventional design.

Fig. 2 is a top plan view thereof; and

Fig. 3 is a schematic diagram of the electrical circuit of the detection system of the photometer of Figs. 1 and 2.

Figure 1:
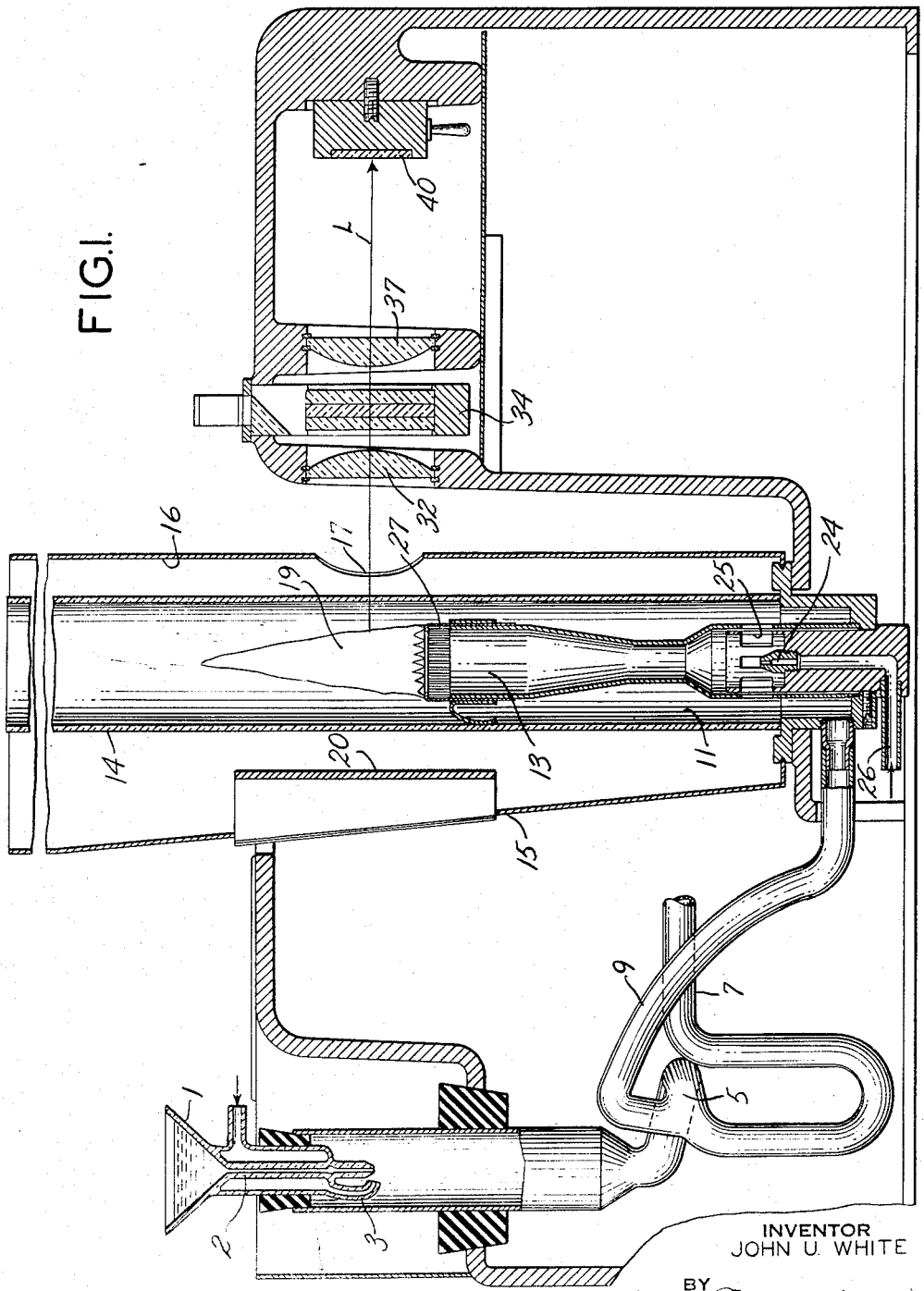
Fig. 1 is a side elevation.

The sample of substance to be analyzed, in which is incorporated an internal standard, and which is in liquid form or in solution, is atomized before introduction into the flame. This is accomplished by placing it in the atomizer funnel 1 whence it flows through the capillary tube 2. As it emerges from the end of the capillary it is atomized by the jet of purified compressed combustion-supporting gas issuing from the line 3. The larger droplets of spray are removed by conducting the spray through the whirl 5, where they are thrown upon the walls and run off into the drain 7. The fine mist which escapes from the whirl is then carried through line 9 into the space 11 between the burner 13, in this case a Meker or Fischer burner, and the chimney 14 surrounding the source. The chimney is made of glass and is placed within a box 15 lined with aluminum or other heat-reflector 16 and provided with an optically clear window 17 opposite the flame 19. At the rear of box is a black surface 20 to prevent reflection through the window 17.

The natural suction created by the stream of combustible gas emerging from the jet 24 draws the gas containing the atomized sample through the intake 25 of the burner upwardly into the interior of the flame, while another portion of the gas containing atomized sample flows upwardly over the outside of the burner through the space 11 and envelops the flame. Thus the flame is blanketed in an atmosphere of purified combustion-supporting gas containing atomized sample. Exhaust gases and unconsumed sample leave the system through the mouth of the chimney. The height, size and intensity of the flame are governed by adjustment of the intake valve 25 of the burner and control of the gas flow through the line 26.

Light emitted by the activated sample in the flame passes to the photoelectric detection system through the window 17 in the box. The window is positioned to take the purest part of the flame, and to exclude light from the grid 27 of the burner and from the unsteady parts of the flame. One beam of light L passes horizontally through the lens 32 and then through the filter 34 wherein light characteristic of the substance being analyzed is transmitted and light of other wave lengths is absorbed, while the other beam of light L' passes through the lens 33 and the filter 35, which absorbs substantially all light except that characteristic of the internal standard incorporated in the sample. Lenses 36 and 37 focus the transmitted light upon photovoltaic cells 40 and 41, respectively, such as iron-selenium cells, or copper-copper oxide cells, which convert the light energy into electrical energy.

As shown in Fig. 3, photovoltaic cells 40 and 41 are connected respectively in a balanced circuit with the sensitivity adjusting potentiometer 42 and an internal standard adjusting potentiometer 43 and the galvanometer 46. The potentiometer 42 enables the operator to control the sensitivity of the instrument while retaining approximately the desired damping resistance. At the outset the potentiometers are balanced against a flame containing a known concentration of standard solution. Unknown sample is then introduced, and the quantity of the substance or element present is determined either by adjusting the potentiometer 43 to again balance the circuits, as indicated by the galvanometer, in which event the potentiometer scale must be calibrated, or by reading the deflection of the galvanometer. In either event the reading is calibrated against solutions of known concentration.

The sample of substance to be analyzed is dispersed in particle form, preferably by atomizing or spraying. The substance may be used in the form of a powder, but preferably if it is a solid it is dissolved in a suitable solvent or dispersed in a liquid, which are more easily handled in spray apparatus. The atomizer or sprayer employed is conventional in design, and forms no part of the present invention.

In one type of atomizer, shown in the drawing, two fine bore or capillary tubes are placed so that their tips are close to each other. Compressed gas, such as combustion-supporting gas, is forced through one tube and as it crosses the tip of the other tube causes a suction therein sufficient to draw the sample of substance through it.

Instead of capillary tubes, stainless steel hypodermic needles may be employed. In this type of atomizer the tubes are readily removed for cleaning or changing to different bore sizes for use with different samples.

In another type of atomizer two concentric tubes are employed, the compressed gas being passed through the outer tube while the sample is introduced through the inner tube. The gas emerging from the outer tube sucks sample into it by virtue of the Venturi effect created at the exit of the tubes.

The sample may be introduced into the sample tube under pressure, by gravity from a funnel or otherwise or sucked upwards from a supply such as a beaker or tank. The atomizer's suction is sufficient to raise the sample several inches with ease. The sample entering the gas stream is broken into a fine spray of droplets of various sizes. The larger droplets are eliminated by gravity or centrifugal force, such as in a whirl as shown in the drawing, while the smaller droplets are carried into the vicinity of the burner. If the gas employed is combustion-supporting gas or a mixture containing combustion-supporting gas, it may be introduced directly into the flame as set forth above. If, however, it is an inert gas such as carbon dioxide or nitrogen, if desired, it may be mixed with combustion-supporting gas in the vicinity of the burner.

These atomizers are well known to the art and are described in the literature.

The optical system collects light from the steadiest part of the flame, renders it monochromatic, and focuses it upon the photosensitive detector. Any type of lens may be used, such as a flask filled with water or Fresnel lenses of heat-resisting glass. To isolate the light it is desired to study for analysis purposes, simple filters may be used, depending upon the light and the response curve of the detector. The art understands which filters to use for light of various wave lengths.

The photosensitive detector must respond to light of the wave length to be studied and must have a sensitivity high enough for the particular task at hand. In addition it may be of the photovoltaic type so that it is not necessary to supply a current to the electrical system. Suitable photovoltaic cells are the copper-copper oxide cell and the iron-selenium cell. In some applications the detector is desirably highly sensitive to the characteristic radiation emitted by only one of the elements contained in the sample. If the circuit is provided with suitable power supply, phototubes of many types may be employed such as electron multiplier tubes, counters, etc.

Under ordinary conditions accurate results are obtainable with the photometer of the invention. However, certain elements may interfere with the intensity of light emitted by the element or substance being analyzed, giving results which are too high (mutual excitation) or too low (quenching). This type of error may be corrected by compounding the standard solutions used to calibrate the instrument in such a manner that the standards contain quantities of the interfering molecules in proportions similar to those contained in the solutions to be analyzed. It is easier, however, to employ an internal standard element which is likewise affected by the interfering element. In this procedure a fixed quantity of the internal standard element is added to each sample to be analyzed. Upon excitation light is emitted by both the element or substance being determined and the internal standard, and the ratio of the intensities of these two characteristic lights is determined. Any change in the results by some factor influencing the light intensity emitted by one element similarly affects the internal standard, so that the ratio of the results obtained is relatively constant, regardless of the experimental conditions. In some instances it may be dsirable to use both of these procedures simultaneously.

The flame source of the invention has been illustrated in conjunction with an internal standard flame photometer because this method is now in general use. However, it is to be understood that the flame source of the invention may be used with any flame photometer. A conventional simple flame photometer is similar to that shown in the drawings, but the second optical system, represented by lenses 33 and 37, filter 35, and photocell 41, is omitted.

The flame source of the invention is also applicable as a source for production of emission spectra for spectrographs. The technique of using such sources to take spectrograms useful in qualitative and quantitative analysis is set forth in the literature.

The flame analyzer embodying a flame source in accordance with the invention is capable of giving very accurate results in both qualitative and quantitative analysis. Because of its high sensitivity as a result of the virtual absence of all impurities, it may be employed to detect traces of elements mingled with large quantities of other materials. Moreover, after proper calibration of the apparatus trace elements may be determined quantitatively with a high degree of accuracy.

Very dilute solutions may be analyzed quantitatively by this apparatus when the flame is blanketed with sample which is introduced not only into the interior of the flame but also in the atmosphere of blanketing gas enveloping the flame. Very dilute solutions of elements whose spectra overlap those of the flame may be analyzed quantitatively by this apparatus when the flame is blanketed with an inert atmosphere, which may also contain the sample.

Jumps in the galvanometer of a flame photometer are eliminated as a result of the elimination of foreign dust and smoke particles. So likewise are spurious lines avoided in the spectrogram taken by a spectrograph which embodies a flame source of the invention.

The flame source is particularly satisfactory for the analysis of alkali metals, since because of its relatively low temperature, other elements are not so strongly excited. However, with the proper spectral isolation to exclude light of uncharacteristic wave lengths it is possible to analyze for many elements.

It will be understood that various additional changes and variations may be made in the invention, and that the invention is to be limited only as set forth in the appended claims.

I claim:

1. In a flame analyzer in which a sample to be analyzed is atomized and supplied to a flame, and in which the intensity of the radiation from the flame at a selected wavelength is measured by a light sensitive detection system, the combination of a burner, a chimney surrounding at least a part of the flame of said burner, said chimney permitting the transmission of radiation from said flame to said detection system, a member abutting the burner and the chimney, said chimney being closed at one end by said member and open at the other end to permit the exit of the flame gases, a conduit in communication with said burner for supplying a combustible gas thereto, a second conduit in communication with the burner and the space within the chimney surrounding the flame for supplying purified combustion supporting gas containing atomized sample to said burner and said space, whereby the atmosphere and contaminants therein are excluded from the flame.

2. In a flame analyzer in which a sample to be analyzed is atomized and supplied to a flame, and in which the intensity of the radiation from the flame at a selected wavelength is measured by a light sensitive detection system, the combination of a burner, a base to which said burner is connected, a chimney surrounding said burner and contiguous to and closed at its lower end by said base and open at its upper end to permit the exit of the flame gases, said chimney permitting the transmission of radiation from said flame to said detection system, a conduit leading through said base for supplying a combustible gas to said burner, a second conduit leading through said base for supplying purified combustion supporting gas containing atomized sample to the space within the chimney for supporting said flame and surrounding it with said gas, whereby the atmosphere and contaminants therein are excluded from the flame.

3. In a flame analyzer in which a sample to be analyzed is atomized and supplied to a flame, and in which the intensity of the radiation from the flame at a selected wavelength is measured by a light sensitive detection system, the combination of a burner, a chimney surrounding at least a part of the flame of said burner which chimney is provided with an opening through which flame gases may exit and which is otherwise closed to exclude from the flame the atmosphere and contaminants therein, said chimney permitting the transmission of radiation from said flame to said detection system, and a conduit in communication with the burner and the space between the flame and the chimney for supplying purified gas and atomized sample to said burner and said space surrounding the flame with said purified gas.

4. In a flame analyzer in which a sample to be analyzed is atomized and supplied to a flame, and in which the intensity of the radiation from the flame at a selected wavelength is measured by a light sensitive detection system, the combination of a burner, a chimney surrounding at least a part of said burner, said chimney being provided with an opening through which flame gases may exit and being otherwise closed to exclude from the flame the atmosphere and contaminants therein, said chimney permitting the transmission of radiation from the flame to said detection system, and a conduit in communication with the space within the chimney to furnish in purified form all of the combustion supporting gas that is required by the flame and to surround the flame with said gas.

5. In a flame analyzer in which a sample to be analyzed is atomized and supplied to a flame, and in which the intensity of the radiation from the flame at a selected wavelength is measured by a light sensitive detection system, the combination of a burner to project a flame therefrom, a chimney having a cross section greater than the cross section of the flame, means mounting the chimney and the burner as a unit with the flame disposed interiorly of the extended surface defined by the sides of the chimney, said chimney permitting the transmission of radiation from said flame to said detection system and having an opening through which gases may exit, means for feeding to the burner a sample atomized in purified gas and for feeding purified gas to the interior peripheral space in the chimney to surround the flame, and means for excluding the atmosphere and contaminants therein from said burner and from said chimney other than at said exit opening.

6. In a flame source of spectral radiation in which an atomized sample is excited in the flame of a burner, the combination with said burner of a chimney having a cross section greater than the cross section of the flame, means mounting the chimney and the burner as a unit with the flame disposed interiorly of the extended surface defined by the sides of the chimney, said chimney permitting the transmission of spectral radiation from said flame and having an opening at one end through which gases may exit, means for closing said chimney at the other end, a conduit in communication with said burner for supplying combustible gas thereto, an atomizer for atomizing sample in a stream of purified combustion supporting gas, a second conduit in communication with the burner and the space within the chimney for supplying purified combustion supporting gas containing said atomized sample to said flame and surrounding it with said gas, whereby the atmosphere and contaminants therein are excluded from the flame.

7. In a flame analyzer in which a sample to be analyzed is atomized and supplied to a flame, and in which the intensity of the radiation from the flame at a selected wavelength is measured by a light sensitive detection system, the combination of a burner, a chimney surrounding said burner and contiguous to and closed at its lower end by the lower part of said burner and open at its upper end to permit the exit of flame gases, said chimney permitting the transmission of radiation from said flame to said detection system, a conduit in communication with said burner for supplying a combustible gas to said burner, a second conduit in communication with the space within the chimney for supplying purified combustion supporting gas containing atomized sample to said space for supporting said flame and surrounding it with said gas, whereby the atmosphere and contaminants therein are excluded from the flame.

JOHN U. WHITE.

(References on following page)

References Cited in the file of this patent

UNITED STATES PATENTS

| Number | Name | Date |
|---|---|---|
| 1,798,785 | Carter | Mar. 31, 1931 |
| 1,820,493 | Reagan | Aug. 25, 1931 |
| 1,837,400 | Behrendt et al. | Dec. 22, 1931 |
| 2,058,522 | Smyly | Oct. 27, 1936 |
| 2,106,147 | Hull | Jan. 18, 1938 |
| 2,110,209 | Engels | Mar. 8, 1938 |
| 2,134,552 | Gaugler | Oct. 25, 1938 |
| 2,200,523 | Tuel | May 14, 1940 |
| 2,270,442 | Jares | Jan. 20, 1942 |
| 2,532,687 | Weichselbaum | Dec. 5, 1950 |

FOREIGN PATENTS

| Number | Country | Date |
|---|---|---|
| 599,190 | Great Britain | Mar. 8, 1948 |

OTHER REFERENCES

Lundegarth, Zeitschrift für Physik, vol. 66 of 1930, pages 109 through 114.